(12) United States Patent
Knight et al.

(10) Patent No.: US 6,397,305 B1
(45) Date of Patent: May 28, 2002

(54) METHOD AND APPARATUS FOR CONTROLLING SHARED MEMORY ACCESS

(75) Inventors: Brian James Knight, Cambridge; Fash Nowashdi, Luton, both of (GB)

(73) Assignee: Virata Ltd., Cambridge (GB)

( * ) Notice: Subject to any disclaimer, the term of this patent is extended or adjusted under 35 U.S.C. 154(b) by 0 days.

(21) Appl. No.: 09/529,367
(22) PCT Filed: Nov. 4, 1998
(86) PCT No.: PCT/GB98/03305
§ 371 (c)(1), (2), (4) Date: Jun. 26, 2000
(87) PCT Pub. No.: WO99/26141
PCT Pub. Date: May 27, 1999

(30) Foreign Application Priority Data

Nov. 13, 1997 (GB) .............................................. 9724033

(51) Int. Cl.[7] .............................................. G06F 12/00
(52) U.S. Cl. ...................... 711/147; 711/135; 711/144; 711/146; 711/143
(58) Field of Search ................. 711/147, 141, 711/143, 144, 135, 146

(56) References Cited

U.S. PATENT DOCUMENTS 4,282,572 A  8/1981  Moore, III et al. ......... 364/200
5,524,234 A  * 6/1996  Martinez ..................... 395/468

FOREIGN PATENT DOCUMENTS

| EP | 0288649 | 11/1988 | |
| EP | 0288649 A1 | * 11/1998 | ........... G06F/13/34 |
| GB | 1555300 | 1/1979 | |

* cited by examiner

Primary Examiner—Do Hyun Yoo
Assistant Examiner—Kimberly McLean
(74) Attorney, Agent, or Firm—Pennie & Edmonds LLP

(57) ABSTRACT

A method and apparatus for controlling memory access in a system where at least a first and a second processor each share a common memory. The first processor has a write buffer, in which it stores words prior to writing them in the common memory, and a cache for receiving words from the common memory. The common memory is mapped twice into the address space of the first processor so that, in a first mapping, the first processor accesses the common memory directly and in a second mapping, the cache is enabled. The common memory can therefore be directly accessed with the first processor and the second processor when they share data that is read from or written into the common memory. The cache is accessed with the first processor in the second mapping for reading and writing data local to the first processor. Information written into the write buffer is tagged and the tagged information is flushed into the shared memory before the shared memory can be accessed by the second processor.

4 Claims, 1 Drawing Sheet

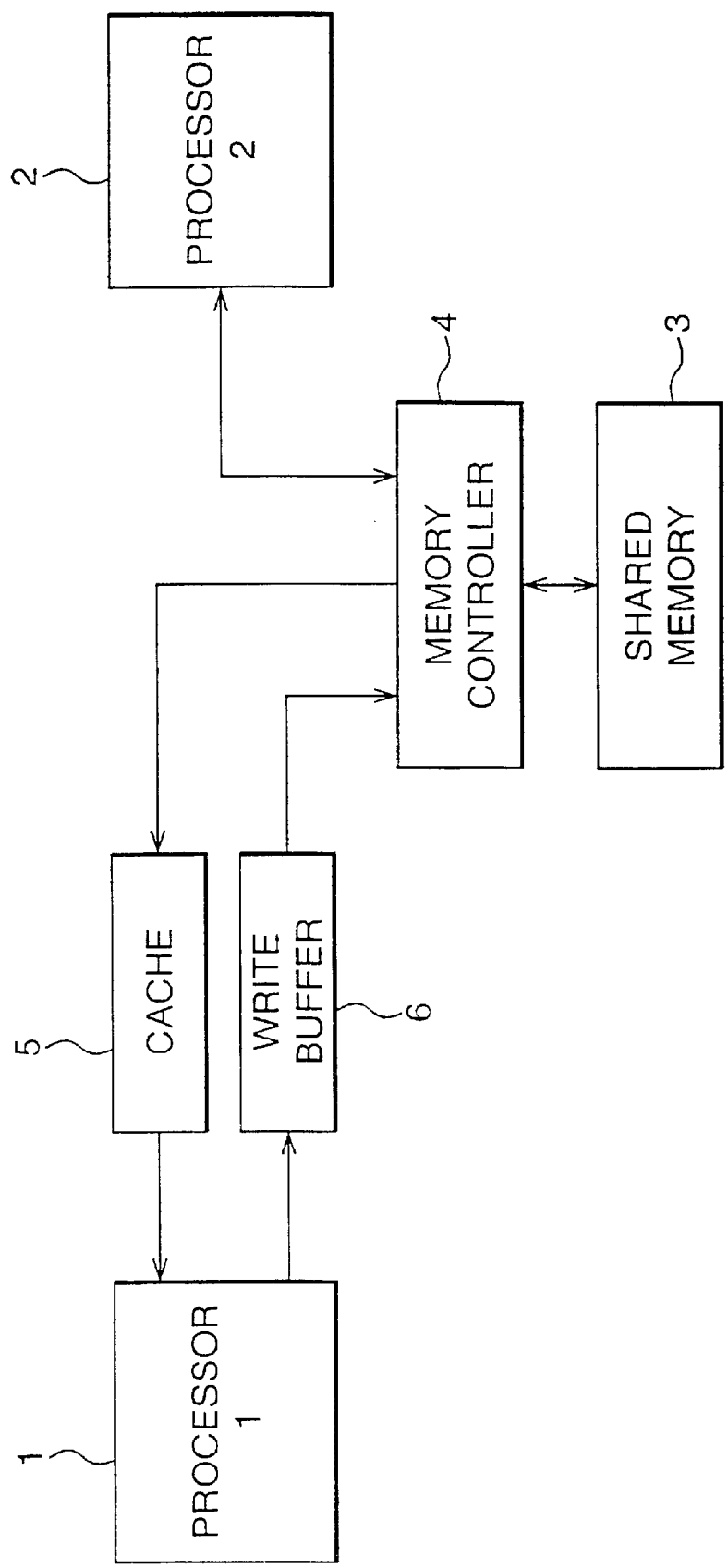

METHOD AND APPARATUS FOR CONTROLLING SHARED MEMORY ACCESS

FIELD OF THE INVENTION

This invention relates to a method and apparatus for controlling memory access in a system where at least a first and a second processor each share a common memory and wherein the first processor has a write buffer, in which it stores words prior to writing them in the common memory, and a cache for receiving words from the common memory.

BACKGROUND

In a computer system with two processors sharing a common memory, one processor can include some optimisations in its memory access path, which are designed to decouple the memory accesses generated by the processor from the physical memory. Such optimisations include a cache, which holds copies of words read recently, or expected to be read soon, and a write buffer, which accepts words from the processor and holds them until they can be written to the common memory. The second processor could have a similar arrangement, but can be assumed (for example) to be directly connected to the common memory. As the first and second processors share data structures in the memory, it is important that they both have the same view of the memory contents. The cache and write buffer make this more difficult, because they decouple the first processor from the true memory contents. However, they would normally allow the first processor to run faster than if it were connected directly to the memory.

The present invention seeks to solve this cache problem.

SUMMARY OF THE INVENTION

The present invention provides a method of controlling memory access in a system where at least a first and a second processor each share a common memory and wherein the first processor has a write buffer, in which it stores words prior to writing them in the common memory, and a cache for receiving words from the common memory, the method including the steps of:

mapping the common memory into the address space of the first processor so that, in a first mapping, the first processor accesses the common memory directly and in a second mapping, the cache is enabled;

accessing the common memory directly with the first processor in the first mapping and also accessing the common memory directly with the second processor when the first and second processors share data that is read from or written into the common memory;

accessing the cache with the first processor in the second mapping for reading and writing data local to the first processor;

tagging information written into the write buffer; and flushing the tagged information into the shared memory before the shared memory can be accessed by the second processor.

In effect, the memory is mapped twice into the address space of the first processor, one mapping accessing the memory directly, while the other has the cache enabled. The first processor uses the uncached mapping when reading or writing any data shared with the second processor, but uses the cached mapping for its private data (e.g. programme code, stacks, local variables). This preserves most of the benefit of having the cache, because the data shared with the other processor would be normally read or written only once.

Although the cache is not very effective for shared data, this is not true of the write buffer, the first processor still benefits from not having to wait for memory writes to finish, even when writing shared data. The first processor still obtains most of the advantage of having the write buffer, but the two processors also have a coherent view of the common memory.

An embodiment of the invention will now be described with reference to the accompanying drawing, in which:

BRIEF DESCRIPTION OF THE DRAWING

An embodiment of the invention will, now be described with reference to the accompanying drawing, in which:

FIG. 1 is a blocked diagram of a computer system embodying the invention.

DETAILED DESCRIPTION OF THE INVENTION

Referring to the drawing, a first processor 1 and a second processor 2 are linked to a common or shared memory 3. Memory controller 4 connects either processor 1 or processor 2 to the memory as may be required. Processor 1 is also connected to a cache 5 and to a write buffer 6. Cache 5 holds copies of words read recently, or expected to be read soon. Write buffer 6 accepts words from the processor 1 and holds them until they can be written into the memory 3. Processor 2 is shown as a simple arrangement without a cache and without a write buffer.

When processor 1 writes to the uncached mapping of the memory 3, the writes (i.e. blocks of written information) still pass through the write buffer 6 but are tagged. When the memory controller 4 is about to hand over control of the memory 3 from processor 1 to processor 2, it first flushes all tagged writes from the write buffer 6 into the memory 3, before processor 2 can access the memory. This enables processor 1 to continue with the cached memory without waiting for a writing phase to finish to the common memory.

This embodiment of the invention shows how the second processor, without cache or write buffer, has access to the memory system. The first pro twice, firstly for its cache and secondly for its write buffer. As is known to those skilled in the art, in memory mapping, physical memory addresses (what's actually on the bus lines) are mapped to different logical addresses (where the processor's program thinks the memory is).

The processor separates out the accesses to the memory system through its use of addresses under its own control and not that of any "third party" logic.

What is claimed is:

1. A method of controlling memory access in a system where at least a first and a second processor each share a common memory and wherein the first processor has a write buffer, in which it stores words prior to writing them in the common memory, and a cache for receiving words from the common memory, the method including the steps of:

mapping the common memory into an address space of the first processor twice so that, when a first memory map is used a first processor accesses the common memory directly and when a second memory map is used, the cache is enabled;

accessing the common memory directly with the first processor using the first memory map;

accessing the common memory directly with the second processor when the first and second processors share data that is read from or written into the common memory;

accessing the cache with the first processor using the second memory map for reading and writing data local to the first processor;

tagging information written into the write buffer; and flushing the tagged information into the common memory before the common memory can be accessed by the second processor.

2. Apparatus for controlling memory access in a system where at least a first and a second processor each share a common memory and wherein the first processor has a write buffer, in which it stores words prior to writing them in the common memory, and a cache for receiving words from the common memory; the apparatus including:

means for mapping the common memory into an address space of the first processor twice so that, when a first memory map is used, the first processor accesses the common memory directly, and when a second memory map is used, the cache is enabled, whereby the common memory can be accessed directly by the first and second processors when they share data that is read from or written into the common memory and the cache can be accessed with the first processor using the second memory map for reading and writing data local to the first processor;

means for tagging information written into the write buffer; and means for flushing the tagged information into the common memory before the common memory can be accessed by the second processor.

3. A method of controlling memory access in a system where at least a first and a second processor each share a common memory and wherein the first processor has an associated write buffer into which the first processor stores words prior to writing them in the common memory, and the first processor also has an associated cache for receiving words from the common memory, the method including the steps of:

mapping physical addresses of the common memory twice into a logical address space of the first processor so that, when a first address range is used, the first processor accesses the common memory directly and when a second address range is used, the cache is accessed;

accessing the common memory directly with the first processor using the first address range;

accessing the common memory directly with the second processor when the first and second processors share data that is read from or written into the common memory;

accessing the cache with the first processor using the second address range for reading and writing data local to the first processor; and flushing information from the write buffer associated with the first processor into the common memory, before permitting the common memory to be accessed by the second processor.

4. A multiprocessor system comprising:

first and second processors;

a common memory directly accessible by said first and second processors to read and write shared data;

a write buffer associated with the first processor, the write buffer configured to store words from the first processor prior to writing said words into the common memory;

a cache memory associated with the first processor, the cache memory configured to receive information from the common memory;

wherein:

physical addresses of the common memory are mapped twice into a logical address space of the first processor so that, when a first logical address range is used, the first processor accesses the common memory directly and when a second logical address range is used, the cache is enabled;

the common memory is accessed by the first processor, when the first processor uses the first logical address range to read and write data that is shared by the first and second processors;

the cache is accessed by the first processor, when the first processor uses the second logical address range to read and write data local to the first processor; and the write buffer is flushed, before the common memory is accessed by the second processor.

* * * * *

UNITED STATES PATENT AND TRADEMARK OFFICE
CERTIFICATE OF CORRECTION

PATENT NO. : 6,397,305 B1
DATED : May 28, 2002
INVENTOR(S) : B. Knight and Farshid Nowshadi It is certified that error appears in the above-identified patent and that said Letters Patent is hereby corrected as shown below:

<u>Title page,</u>
Item [75], Inventors, change "Fash Nowashdi" to -- Farshid Nowshadi --

Signed and Sealed this

Twenty-second Day of October, 2002

*Attest:*

*Attesting Officer*

JAMES E. ROGAN
*Director of the United States Patent and Trademark Office*